US008405844B2

(12) United States Patent
Naruse

(10) Patent No.: US 8,405,844 B2
(45) Date of Patent: Mar. 26, 2013

(54) IMAGE FORMING DEVICE

(75) Inventor: Kenichi Naruse, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 585 days.

(21) Appl. No.: 12/567,605

(22) Filed: Sep. 25, 2009

(65) Prior Publication Data

US 2010/0073704 A1 Mar. 25, 2010

(30) Foreign Application Priority Data

Sep. 25, 2008 (JP) ................................ 2008-245873

(51) Int. Cl.
*G06F 15/00* (2006.01)
*G06F 13/26* (2006.01)

(52) U.S. Cl. ...................................... 358/1.14; 710/264

(58) Field of Classification Search .................. 358/1.14
See application file for complete search history.

(56) References Cited

U.S. PATENT DOCUMENTS

| | | | | |
|---|---|---|---|---|
| 6,092,943 | A * | 7/2000 | Dan | 400/249 |
| 2005/0084272 | A1* | 4/2005 | Kikuchi | 399/12 |
| 2007/0002396 | A1 | 1/2007 | Naruse | |

FOREIGN PATENT DOCUMENTS

| | | | |
|---|---|---|---|
| JP | H01-279260 | A | 11/1989 |
| JP | H03-277578 | A | 12/1991 |
| JP | H09-033897 | A | 2/1997 |
| JP | H10-187002 | A | 7/1998 |
| JP | 2004020963 | A | 1/2004 |
| JP | 2005-161549 | A | 6/2005 |
| JP | 2005-178195 | A | 7/2005 |
| JP | 2007-010949 | A | 1/2007 |
| JP | 2007171251 | A | 7/2007 |

OTHER PUBLICATIONS

Japan Patent Office, Decision of Rejection for Japanese Patent Application No. 2008-245873, dispatched Feb. 10, 2011.
Japan Patent Office; Notification of Reasons of Rejection in Japanese Patent Application No. 2008-245873 mailed on Jun. 22, 2010.

* cited by examiner

*Primary Examiner* — Saeid Ebrahimi Dehkordy
(74) *Attorney, Agent, or Firm* — Baker Botts L.L.P.

(57) ABSTRACT

An image forming device includes a processor configured to process image data, an image forming unit configured to perform image formation based on the image data processed by the processor, a cover configured to, when being opened, allow an external access to the image forming unit therethrough, a detector configured to detect whether the cover is opened, and an interrupting unit configured to, when determining with the detector that the cover is kept opened for a first time period, interrupt the processing of the image data by the processor.

13 Claims, 9 Drawing Sheets

IMAGE FORMING DEVICE

CROSS-REFERENCE TO RELATED APPLICATION

This application claims priority under 35 U.S.C. §119 from Japanese Patent Application No. 2008-245873 filed on Sep. 25, 2008. The entire subject matter of the application is incorporated herein by reference.

BACKGROUND

1. Technical Field

The following description relates to one or more image forming devices, more particularly to one or more techniques to protect the image forming devices from electrostatically-caused errors.

2. Related Art

A technique has been known which is adapted to reset an application specific integrated circuit (ASIC) to avoid electrostatically-caused malfunction when a cover is opened such that a user can access the inside of a printer (an image forming device).

SUMMARY

However, according to the aforementioned technique, the ASIC is reset even when the cover is opened in such a manner that the user can hardly touch the inside of the device, such as when the cover is opened just for a moment and then soon closed. Therefore, in such a case, an unnecessary time period might be required for restoring the ASIC from the reset state, and thus it result in lower printing efficiency.

Aspects of the present invention are advantageous to provide one or more improved image forming devices that make it possible to improve efficiency of image formation.

According to aspects of the present invention, an image forming device is provided, which includes a processor configured to process image data, an image forming unit configured to perform image formation based on the image data processed by the processor, a cover configured to, when being opened, allow an external access to the image forming unit therethrough, a detector configured to detect whether the cover is opened, and an interrupting unit configured to, when determining with the detector that the cover is kept opened for a first time period, interrupt the processing of the image data by the processor.

According to aspects of the present invention, further provided is an image forming device, which includes a processor configured to process image data, an image forming unit configured to perform image formation based on the image data processed by the processor, a cover configured to, when being opened, allow an external access to the image forming unit therethrough, a detector configured to detect whether the cover is opened, and a maintaining unit configured to, when determining with the detector that the cover is kept opened for less than a first time period, maintain the processing of the image data by the processor.

BRIEF DESCRIPTION OF THE ACCOMPANYING DRAWINGS

Figure 3:
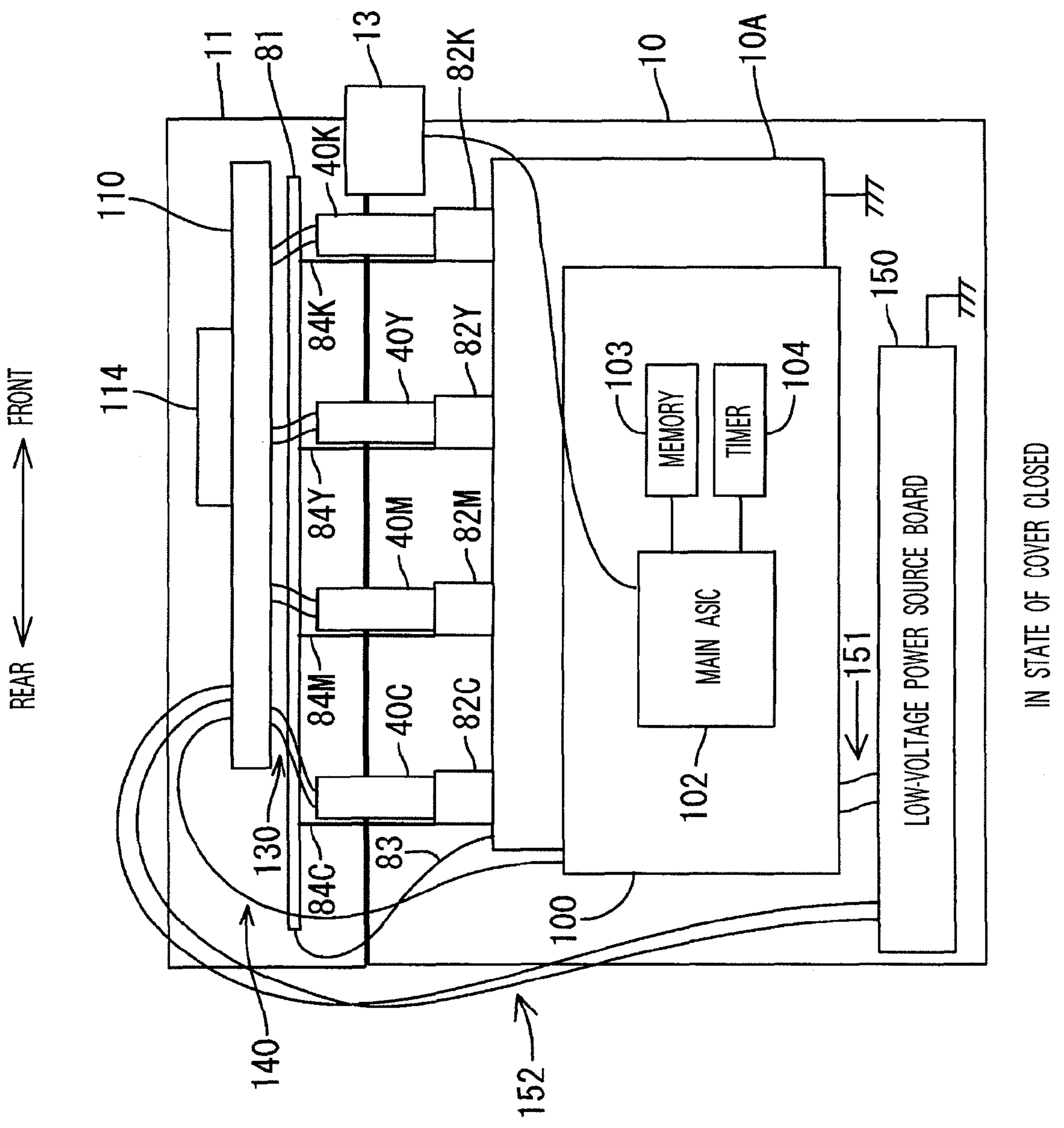

FIG. 3 schematically shows positional states of the LED units when an upper cover is closed in the embodiment according to one or more aspects of the present invention.

Figure 4:
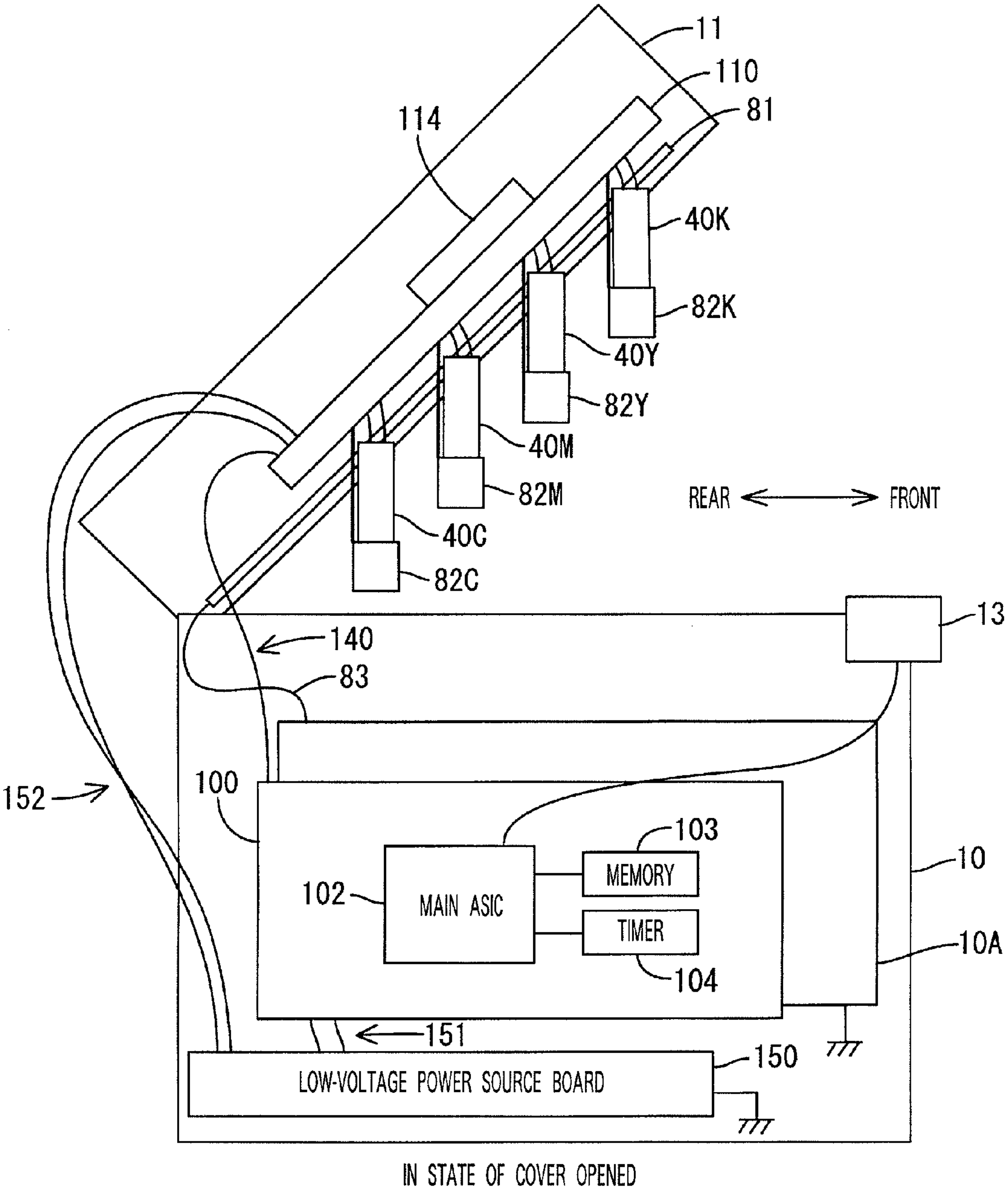

FIG. 4 schematically shows positional states of the LED units when the upper cover is opened in the embodiment according to one or more aspects of the present invention.

Figure 5:
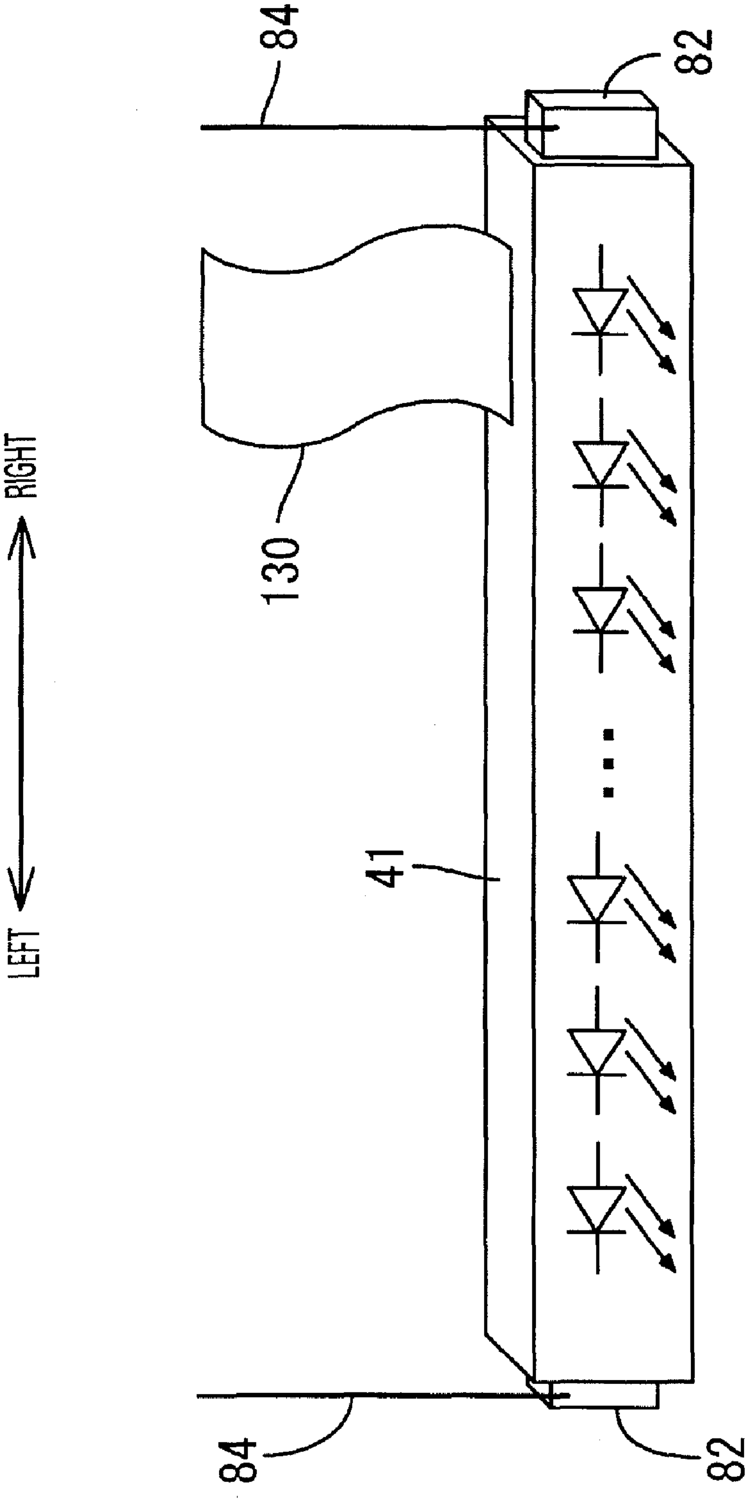

FIG. 5 is a perspective view schematically showing an LED unit in the embodiment according to one or more aspects of the present invention.

Figure 6:
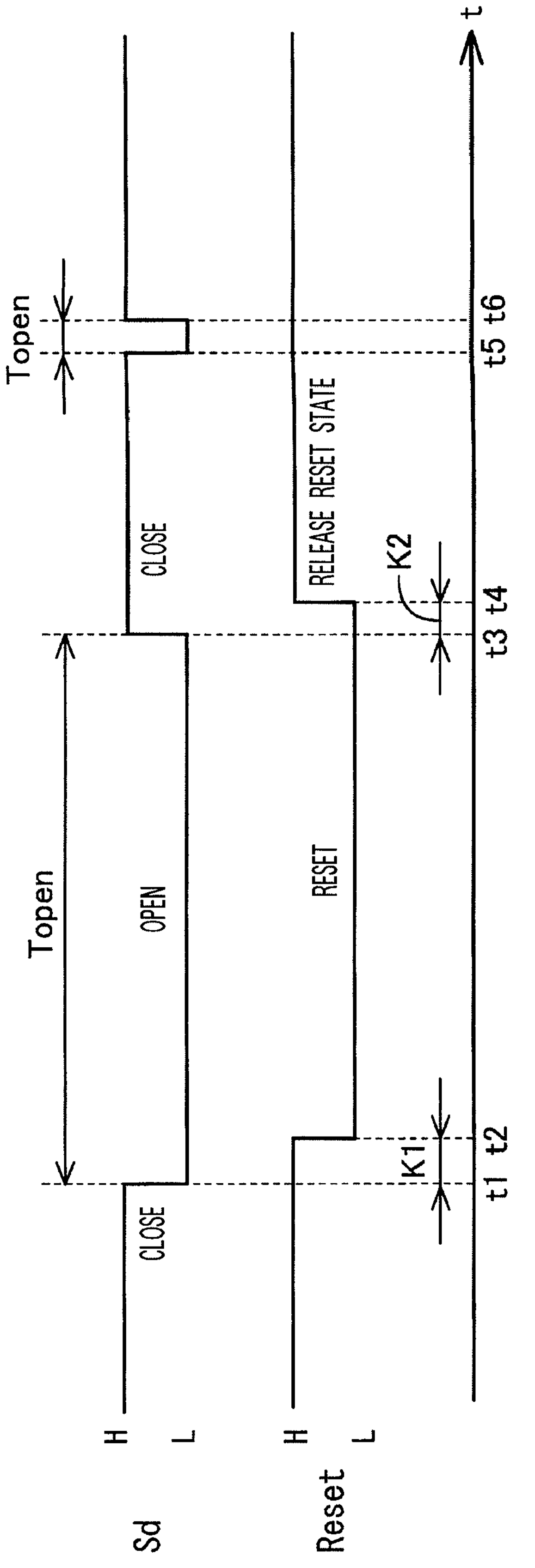

FIG. 6 is a time chart showing a relationship between an open-close detection signal Sd issued in response to an operation of opening/closing the upper cover and a reset signal Reset in a ready state of the printer in the embodiment according to one or more aspects of the present invention.

Figure 7:
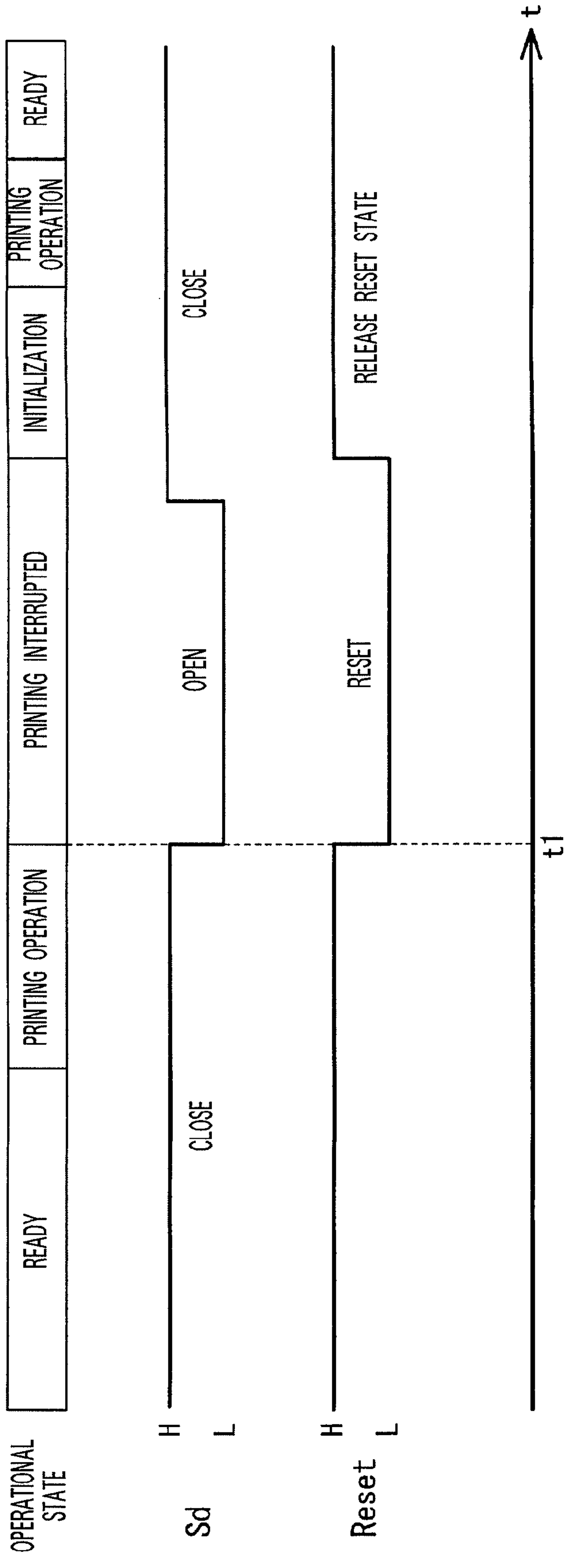

FIG. 7 is a time chart showing a relationship between the open-close detection signal Sd and the reset signal Reset during a printing operation by the printer in the embodiment according to one or more aspects of the present invention.

Figure 8:
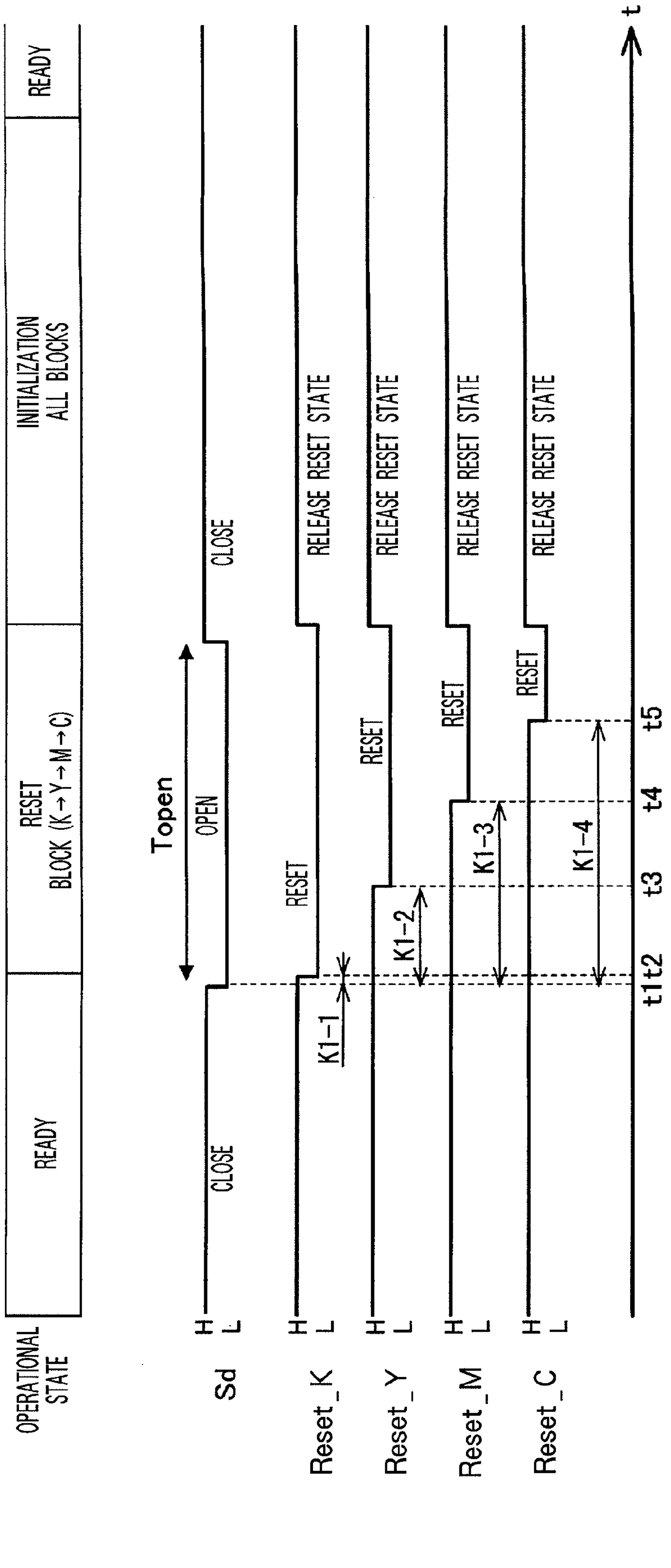

FIG. 8 is a time chart showing a relationship between the open-close detection signal Sd and the reset signal Reset corresponding to each block in the ready state of the printer in the embodiment according to one or more aspects of the present invention.

Figure 9:
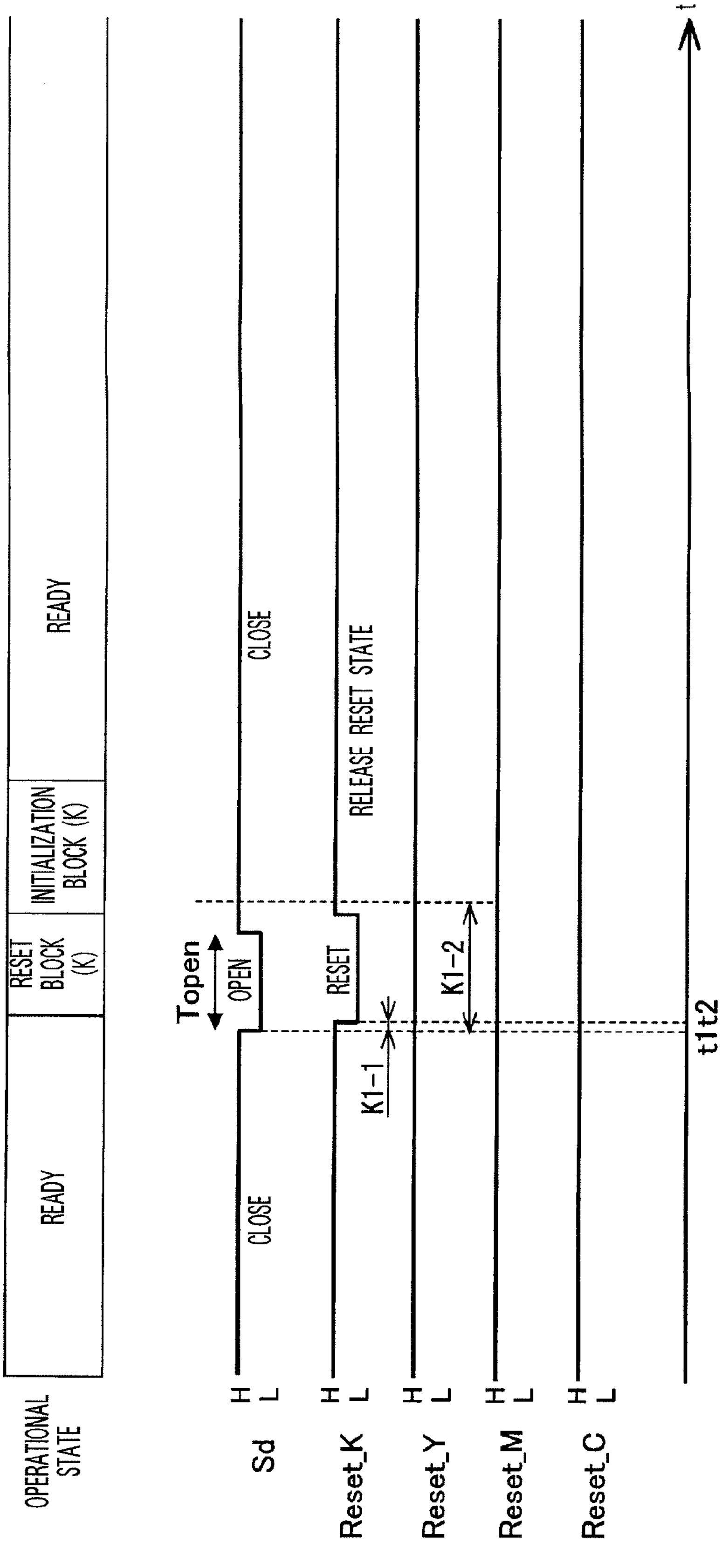

FIG. 9 is another time chart showing a relationship between the open-close detection signal Sd and the reset signal Reset corresponding to each block in the ready state of the printer in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Embodiment

1. Overall Configuration of Printer

Figure 1:
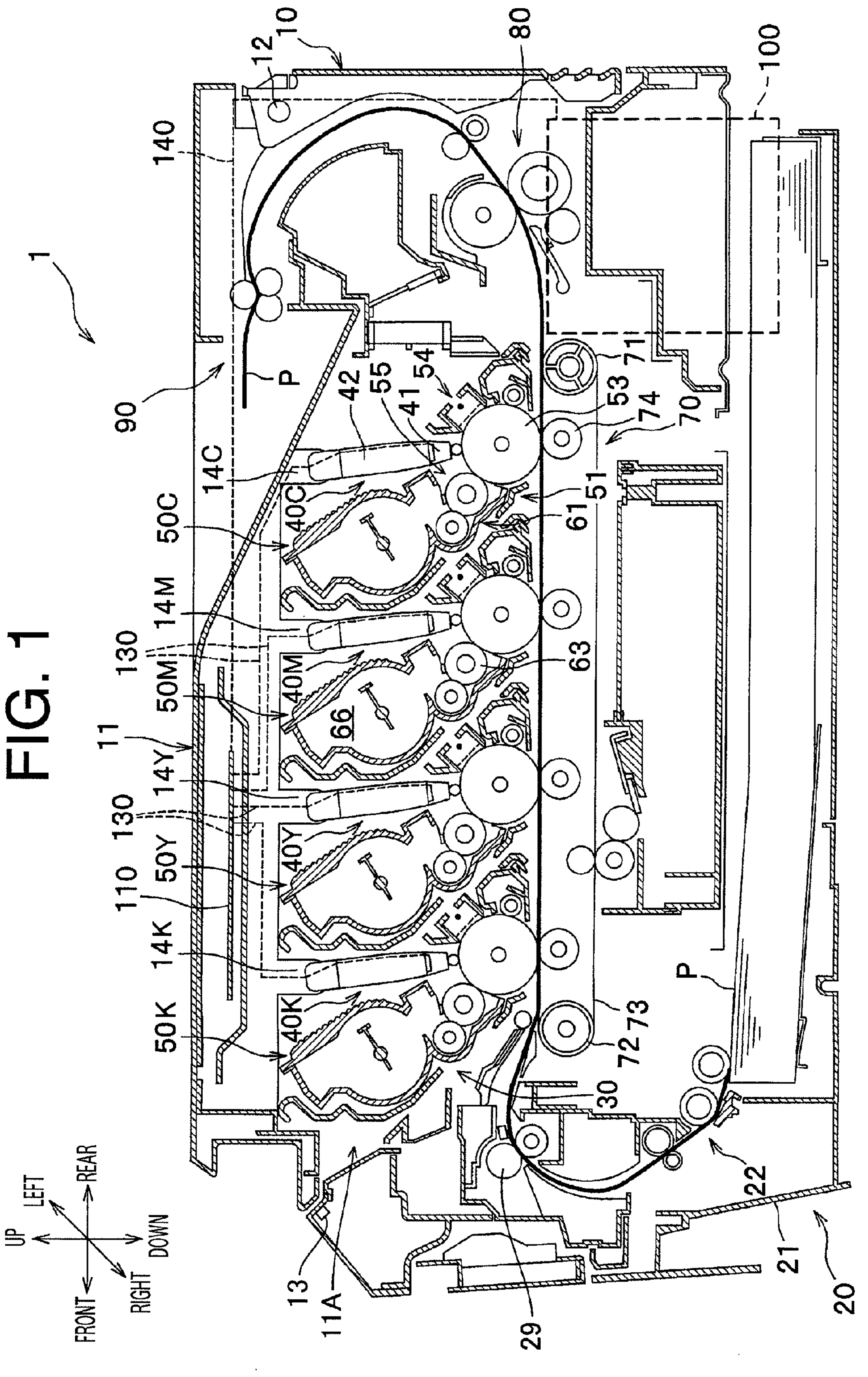
FIG. 1 is a cross-sectional view schematically showing an overall configuration of a color printer in an embodiment according to one or more aspects of the present invention.

Hereinafter, an embodiment according to aspects of the present invention will be described with reference to FIGS. 1 to 9. FIG. 1 is a cross-sectional view schematically showing an overall configuration of a color printer 1 as an image forming device in an embodiment according to aspects of the present invention. The image forming device of the embodiment is not limited to a color printer. For instance, the image forming device may be a Multi-Function Peripheral (MFP) provided with various functions such as a copy function and a facsimile function.

In FIG. 1, the left side and the right side on the figure are defined as a front side and a rear side of the printer 1, respectively. Further, the near side and the far side in the direction perpendicular to the figure are defined as a right side and a left side of the printer 1, respectively. Moreover, the upside and the downside on the figure are defined as an upside and a downside of the printer 1, respectively. Here, the color printer 1 is configured to form a color image with four colors (black K, yellow Y, magenta M, and cyan C) of developers.

As illustrated in FIG. 1, the color printer 1 (hereinafter, simply referred to as a printer 1) includes, in a main body 10, a feeding unit 20 configured to feed a sheet P, an image forming unit 30 configured to form an image on the sheet P fed, an ejecting unit 90 configured to eject the sheet P with the image formed thereon, and a main control board 100 configured to control each of the aforementioned units when forming the image.

At an upper side of the main body 10, an upper cover 11 is attached rotatably in the vertical direction around a rotation shaft 12 which is provided at a rear end of the printer 1. The upper cover 11 is provided with an LED control board 110 configured to control an LED unit (40K, 40Y, 40M, or 40C) corresponding to each color. It is noted that, in the following description, respective components corresponding to the colors that have the same configuration may be identified with only an element number. Specifically, for instance, each of the LED units (40K, 40Y, 40M, and 40C) may be identified as the LED unit 40.

When a front end of the upper cover 11 is lifted and opened around the rotation shaft 12, an opening 11A is formed sequentially from the front side of the main body 10. Through the opening 11A, a user can access the image forming unit 30.

Further, to a portion of the main body 10 that faces a front end of the upper cover 11, a cover switch 13 is provided which is configured to detect an opened/closed state of the upper cover 11 with it being set ON/OFF depending on the opened/closed state of the upper cover 11. The cover switch 13 generates an open-close detection signal Sd based on the ON/OFF state thereof.

The upper cover 11 is configured with an upper surface thereof onto which the sheet P is ejected from the main body 10, and a lower surface thereof at which four holding members (14K, 14Y, 14M, and 14C) for holding the respective LED units (40K, 40Y, 40M, and 40C) is provided.

The feeding unit 20, disposed at a lower side within the main body 10, includes a feed tray 21 detachably attached to the main body 10, and a sheet feeding mechanism 22 configured to feed the sheet P from the feed tray 21 to the image forming unit 30. The sheets P stacked in the feed tray 21 are sequentially conveyed up by the sheet feeding mechanism 22 in a manner separated on a sheet-by-sheet basis. After that, the sheet P is fed to the image forming unit 30 via a registration roller 29 that performs positional correction for the sheet P.

The image forming unit 30 includes the four LED units (40K, 40Y, 40M, and 40C) respectively corresponding to the four colors and four process cartridges (50K, 50Y, 50M, and 50C) respectively corresponding to the four colors, a transfer unit 70, and a fixing unit 80. Each of the LED units 40, placed above a corresponding one of photoconductive drums 53, has an LED head 41 disposed to face the photoconductive drum 53, and a back plate 42.

The LED head 41 has a plurality of light-emitting diodes (LEDs) aligned in the right-to-left direction on a surface of the LED head 41 that faces the photoconductive drum 53 (see FIG. 5). Each of the LEDs emits light in accordance with a signal input thereinto from the below-mentioned LED control board 110 based on image data of an image to be formed, and exposes the surface of the photoconductive drum 53 with the emitted light. Namely, each of the LEDs is driven by a sub ASIC 114 of the LED control board 110 in accordance with a lighting pattern based on the image data (see FIG. 2).

The back plate 42, which is a member supporting the LED head 41, is attached swingably to the upper cover 11 via the holding member 14. Thereby, when the upper cover 11 is turned up, each LED unit 40 (LED head 41) is moved from an exposure position where the LED unit 40 faces the photoconductive drum 53 to an upper evacuation position (see FIG. 4).

As illustrated in FIG. 1, the process cartridges (50K, 50Y, 50M, and 50C) are aligned in the front-to-rear direction between the upper cover 11 and the feed unit 20. Further, each process cartridge 50 has a drum unit 51 and a development unit 61 detachably attached to the drum unit 51. The development unit 61 has a development roller 63 and a toner container 66. It is noted that the process cartridges 50 have the same configuration with just difference among the colors of toners respectively stored in the toner containers 66 of the development units 61.

The drum unit 51 is provided with the photoconductive drum 53 and a charger 54. When the development unit 61 is attached to the drum unit 51, the drum unit 51 has an exposure hole formed such that the photoconductive drum 53 is externally viewed therethrough. The LED unit 40 (LED head 41) is inserted into the exposure hole 55 to face an upper surface of the photoconductive drum 53.

The transfer unit 70, provided between the feed unit 20 and the process cartridges 50, includes a driving roller 71, a driven roller 72, a feeding belt 73, and a transfer roller 74.

The feeding belt 73 is wound around the driving roller 71 and the driven roller 72. Inside the feeding belt 73, four transfer rollers 74 are disposed to face the respective photoconductive drums 53 across the feeding belt 73. In other words, the feeding belt 73 is pinched between each transfer roller 74 and the photoconductive drum 53 facing the transfer roller 74. The fixing unit 80 is disposed behind the process cartridges 50 and the transfer units 70.

In the image forming unit 30 configured as above, first, the surface of each photoconductive drum 53 is evenly charged by the corresponding charger 54, and then exposed with LED light emitted by the corresponding LED head 41. Thereby, an electrical potential of the exposed portion drops, and an electrostatic latent image based on the image data is formed on the surface of each photoconductive drum 53.

Subsequently, the toner stored in the toner container 66 is supplied to the development roller 63. The toner held on the development roller 63 is supplied to the electrostatic latent image formed on the photoconductive drum 53. Thereby, the toner is selectively held on the photoconductive drum 53 and the electrostatic latent image is developed into a visible image. Thus, a toner image is formed through inversion development.

Then, while the sheet P supplied onto the feeding belt 73 is passing between the photoconductive drums 53 and the transfer rollers 74, the toner images respectively formed on the photoconductive drums 53 are sequentially transferred onto the sheet P. When the sheet P passes through the fixing unit 80, the toner images transferred onto the sheet P are thermally fixed. Thereafter, the sheet P with the toner images thermally fixed thereon is ejected onto the upper cover 11.

2. Electrical Configuration for Light Emission Control

Figure 2:
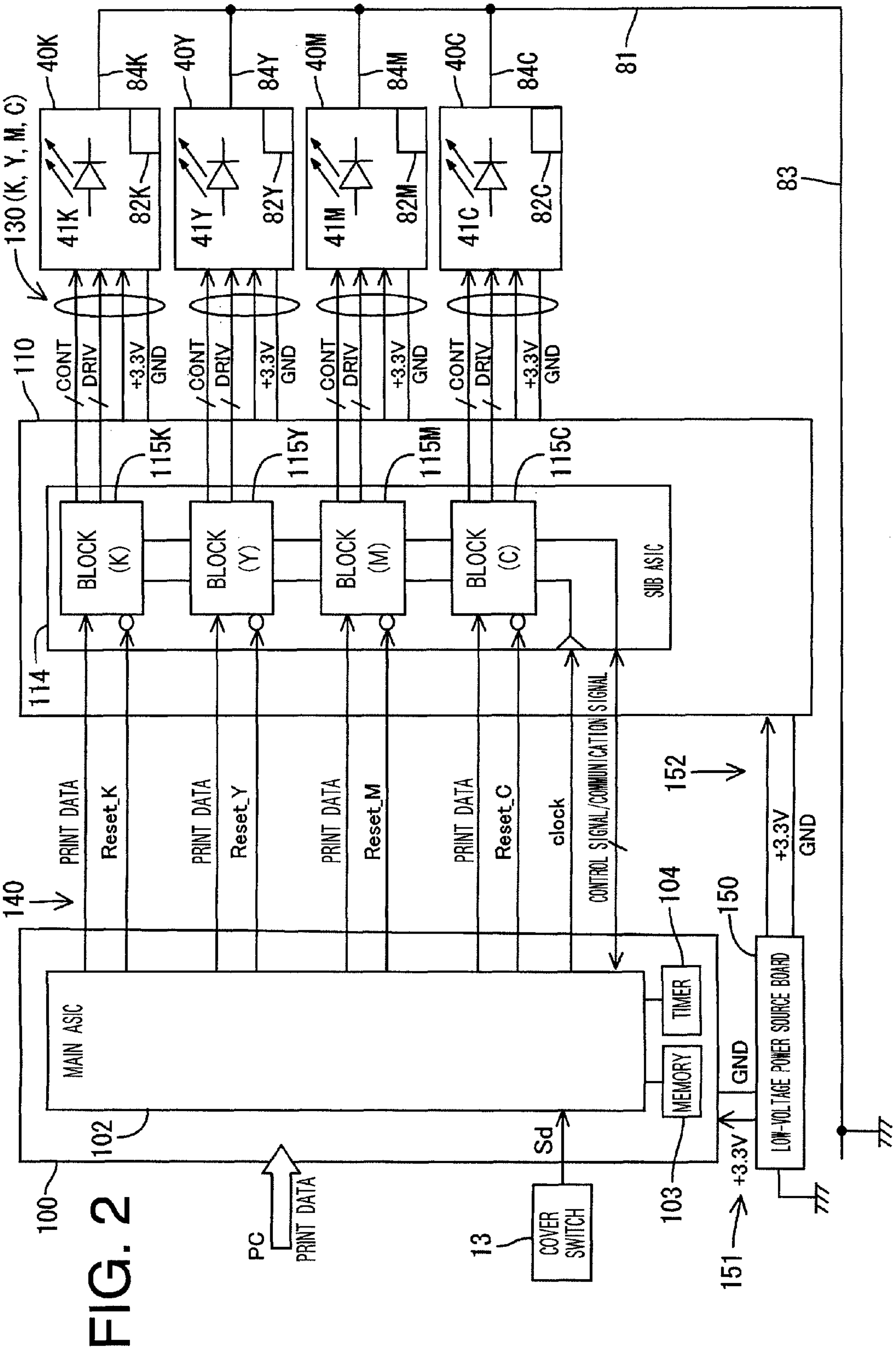
FIG. 2 is a block diagram schematically showing an electrical configuration for light emission control illumination, in which a main ASIC, a sub ASIC, and LED units are connected in the embodiment according to one or more aspects of the present invention.

Next, an electrical configuration for light emission control in the embodiment will be described with reference to FIGS. 2 to 5. FIG. 2 is a block diagram schematically showing an electrical configuration for light emission control, in which the main control board 100, the LED control board 110, and the LED units 40 are electrically connected. FIG. 3 shows a positional state of each LED unit 40 when the upper cover 11 is closed. FIG. 4 shows a positional state of each LED unit 40 when the upper cover 11 is opened. FIG. 5 is a perspective view schematically showing the LED head 41.

The main control board 100 includes a main application specific integrated circuit (ASIC) 102, a memory unit 103, and a timer unit 104. The main ASIC 102 is configured to control each element included in the printer 1 when the printer 1 performs image formation. The memory unit 103 includes a ROM and a RAM. Further, the timer unit 104 includes one or more timers for measuring time periods taken for processes by the main ASIC 102.

Specifically, the main ASIC 102 controls rotational speeds of the photoconductive drum 53 and the driving roller 71, a speed at which the sheet P is fed at the feed unit 20 or the fixing unit 80, and timing for exposure directly or indirectly via another control board such as the LED control board 110. Especially, in control for illumination of the light emitted by each LED unit 40, the main ASIC 102 supplies print data, reset signals (Reset), control signals (containing setting data and correction data), and a clock signal (clock) to the LED control board 110.

In the meantime, the LED control board 110 provided to the upper cover 11 includes a sub ASIC 114. The main ASIC 102 and the sub ASIC 114 are linked via a flat cable 140. The sub ASIC 114 is configured to transmit control signals (CONT) and drive signals (DRIV) to the LED heads 41 based on the image data of the image to be formed and to control emission of each LED head 41 in accordance with the lighting pattern based on the image data.

More specifically, the sub ASIC 114 includes four blocks (115K, 115Y, 115M, and 115C) that correspond to the four LED units (40K, 40Y, 40M, and 40C), respectively. Each of the blocks 115 receives the print data, the control signals (containing setting data and correction data), and the reset signal Reset from the main ASIC 102 via the flat cable 140. Each of the blocks 115 is individually brought into a reset state where an operation thereof is reset, by the reset signal Reset. In the reset state, a process performed by each block 115 for the image formation, such as generation and output of the control signal CONT and the drive signal DRIV, is stopped.

In addition, the LED units 40 (the LED heads 41) are electrically connected with the blocks 115 of the sub ASIC 114 via flat cables (130K, 130Y, 130M, and 130C), respectively. An earth cable 84 of each LED unit 40 is linked with a shield plate 81. Further, as illustrated in FIGS. 3 and 4, the shield plate 81 is linked, via an earth cable 83, with a conductive chassis 10A connected to ground. Namely, each earth cable 84 is connected to ground. It is noted that, as illustrated in FIG. 5, the earth cables 84 is provided at both sides of each LED head 41 in the right-to-left direction.

In addition, each LED unit 40 has earth contact points 82. As illustrated in FIG. 5, the earth contact points 82 are respectively provided at both the sides of the LED head 41 in the right-to-left direction. Each of the earth contact points 82 establishes contact with the conductive chassis 10A only when the upper cover 11 is closed (see FIG. 3). In other words, as shown in FIG. 4, when the upper cover 11 is opened, each of the earth contact points 82 is away from the conductive chassis 10A. Therefore, when the upper cover 11 is opened, the LED control board 110 is connected to the ground at the side of the LED control board 110 via the earth cable 83.

Further, as illustrated in FIG. 2, the printer 1 includes a low-voltage power source board 150. The low-voltage power source board 150 generates, e.g., a low voltage of 3.3 V and supplies the low voltage to the main control board 100 via a power source cable 151 and to the LED control board 110 via a power source cable 152.

3. Reset Control of Sub ASIC

Subsequently, referring to FIGS. 6 to 9, reset control for the sub ASIC 114 to be taken along with operations of opening and closing the upper cover 11 will be set forth.

3-1. Reset Control in Ready State

Practical Example 1

Referring to FIG. 6, reset control for the sub ASIC 114 will be described which is taken when the upper cover 11 is opened in a ready state where the printer 1 performs no printing operation. FIG. 6 is a time chart showing a relationship between the open-close detection signal Sd issued in response to an operation of opening/closing the upper cover 11 and the reset signal Reset, in the ready state of the printer 1.

It is assumed that the user opens the upper cover 11 at a time t1 shown in FIG. 6, for an operation such as replacing a process cartridge 50. At this time, the cover switch 13 generates an open-close detection signal Sd which drops from a logic high level (H) to a logic low level (L) in response to the upper cover 11 being opened, and supplies the open-close detection signal Sd to the main ASIC 102.

Then, at a time t2 after lapse of a predetermined time period K1 since the time t1, the main ASIC 102 generates a reset signal Reset which drops from a logic high level (H) to a logic low level (L). The predetermined time period K1 is, for instance, measured by a timer of the timer unit 104. It is noted that the predetermined time period K1 is, for instance, set to a time period until the user may touch the image forming unit 30 such as the process cartridge 50 after opening the upper cover 11.

The reset signal Reset is supplied to the sub ASIC 114. Specifically, for example, the reset signal Reset is concurrently supplied to each of the blocks (115K, 115Y, 115M, and 115C) of the sub ASIC 114 to concurrently set each of the blocks 115 to the reset state. The reason why each of the blocks 115 is set to the reset state here is to avoid malfunction of each block 115 electrostatically caused when the user touches an earth contact point 82 of an LED unit 40 during the operation.

Subsequently, it is assumed that the user completes the operation and closes the upper cover 11 at a time t3 shown in FIG. 6. At this time, the cover switch 13 generates an open-close detection signal Sd that rises from the logic low level (L) to the logic high level (H) in response to the upper cover 11 being closed, and supplies the open-close detection signal Sd to the main ASIC 102.

Then, at a time t4 after lapse of a predetermined time period K2 since the time t3, the main AISC 102 changes the reset signal Reset from the logic low level (L) to the logic high level (H). The predetermined time period K2 is, for example, measured by a timer of the timer unit 104.

By the reset signal Reset of the logic high level (H), the reset state of each block 115 of the sub ASIC 114 is concurrently released, and an initialization process is carried out in each block 115. After the initialization process is completed, each block 115 keeps waiting in a ready state.

The reason why the reset state of each block 115 is released after lapse of the predetermined time period K2 since the upper cover 11 has been closed is as follows. For example, when the upper cover 11 is not completely closed, the open-close detection signal Sd may wiggle between the logic high level (H) and the logic low level (L). Even in such a situation, when the reset state of each block 115 is released, it is possible to prevent the operations of setting and releasing the reset state of each block 115 from being unnecessarily repeated by the open-close detection signal Sd wiggling. In other words, it is possible to render invalid fluctuation of the open-close detection signal Sd within the predetermined time period K2.

In addition, as shown in FIG. 6, when the upper cover 11 is opened at a time t5 and closed at a time t6, and a cover-opened time period Topen between the time t5 and the time t6 is shorter than the predetermined time period K1, the main ASIC 102 does not render valid the reset signal Reset (namely, does not set the reset signal Reset to the logic low level) or reset each block 115.

In other words, when the user opens the upper cover 11 for a short while such that the user does not touch the inside of the main body 10 (e.g., for just taking a look at the inside of the main body 10) and soon closes the upper cover 11, each block 115 is not reset. This is to reduce unnecessary stop operations for the sub ASIC 114 and improve efficiency of the image formation by the printer 1.

3-2. Reset Control in Printing Operation

Practical Example 2

Next, referring to FIG. 7, reset control for the sub ASIC 114 will be set forth which is taken when the upper cover 11 is opened during a printing operation by the printer 1. FIG. 7 is a time chart showing a relationship between the open-close detection signal Sd and the reset signal Reset during the printing operation by the printer 1. It is noted that the "printing operation" by the printer 1 includes operations until the printer 1 prints out a predetermined number of pages of sheets P after receiving a command to print the predetermined number of pages of sheets P.

For example, it is assumed that a sheet P becomes jammed at a time t1 shown in FIG. 7 and the user opens the upper cover 11 to remove the jammed sheet P. At this time, in response to the upper cover 11 being opened, the cover switch 13 generates the open-close detection signal Sd which drops from the logic high level (H) to the logic low level (L) and supplies the open-close detection signal Sd to the main ASIC 102.

At this time, the main ASIC 102 changes the reset signal Reset from the logic high level (H) to the logic low level (L) to set each block 115 of the sub ASIC 114 to the reset state. Namely, when the upper cover 11 is opened during the printing operation, each block 115 is reset at the same time when the upper cover 11 is opened, as illustrated in FIG. 7. When the upper cover 11 is opened during the printing operation by the printer 1, the user is, in general, likely to access the image forming unit 30 to perform paper jam settlement or cartridge replacement. In such a case, a long cover-opened time period Topen is required. Therefore, by stopping (resetting) the sub ASIC 114 promptly, it is possible to avoid malfunction of the sub ASIC 114 electrostatically caused when the user touches an earth contact point 82 of an LED head 41 in an operation.

It is noted that, in the same manner as the practical example 1, the reset state of each block 115 is not released at the same time when the upper cover 11 is closed. Hence, it is possible to reduce unnecessary stop operations for the sub ASIC 114.

3-3. Reset Control for Each Block

Practical Example 3

Subsequently, referring to FIGS. 8 and 9, reset control will be set forth which is taken to individually reset the blocks 115 of the sub ASIC 114. FIGS. 8 and 9 are time charts showing relationships between the open-close detection signal Sd and a reset signal (Reset_K, Reset_Y, Reset_M, or Reset_C) corresponding to each of the blocks 115. In the practical examples 1 and 2, each of the blocks 115 is concurrently reset by the reset signal Reset. Meanwhile, in the practical example 3, a predetermined time period K1 after the upper cover 11 is opened is set for each of the blocks 115, and the blocks 115 are reset at respective different moments.

Specifically, in the case where the upper cover 11 is opened at a time t1 shown in FIG. 8 when the printer 1 is in the ready state, the main ASIC 102 first changes the reset signal Reset_K for the block 115K from the logic high level (H) to the logic low level (L) at a time t2 after lapse of a predetermined time period (K1-1) since the time t1. Then, the main ASIC 102 supplies the reset signal Reset_K of the logic low level (L) to the block 115K and sets the block 115K to the reset state.

Subsequently, the main ASIC 102 changes the reset signal Reset_K for the block 115Y from the logic high level (H) to the logic low level (L) at a time t3 after lapse of a predetermined time period (K1-2) since the time t1. Then, the main ASIC 102 supplies the reset signal Reset_Y of the logic low level (L) to the block 115Y and sets the block 115Y to the reset state.

In the same manner, at a time t4 after lapse of a predetermined time period (K1-3) since the time t1, the main ASIC 102 supplies the reset signal Reset_M of the logic low level (L) to the block 115M and sets the block 115M to the reset state. Further, at a time t5 after lapse of a predetermined time period (K1-4) since the time t1, the main ASIC 102 supplies the reset signal Reset_C of the logic low level (L) to the block 115C and sets the block 115C to the reset state. It is noted that, here, the predetermined time period (K1-1), which corresponds to the LED unit 40K provided the closest to an open end (a front end opposite to the rotation shaft 12) of the upper cover 11, is set to be the shortest among the predetermined time periods K1 (K1-1, K1-2, K1-3, and K1-4).

The reason why the different predetermined time periods K1 after the upper cover 11 is opened are respectively set for the blocks 115, and the blocks 115 are reset at respective different moments is given as follow. For example, as illustrated in FIG. 9, the cover-opened time period Topen during which the upper cover 11 is opened is longer than the predetermined time period (K1-1) and shorter than the predetermined time period (K1-2), the block 115K is only reset. In other words, when the cover-opened time period Topen is short, the number of blocks 115 reset can be reduced. Therefore, an initialization time period for initializing the blocks 115 after the reset states of the blocks 115 are released can drastically be reduced in comparison with the case where all the blocks 115 are initialized (see FIGS. 8 and 9). Thus, it leads to improved efficiency of the image formation by the printer 1 to reduce unnecessary stop operations for the blocks 115 depending on the cover-opened time period Topen and shorten the initialization time period for the blocks 115.

Further, the reason why the blocks 115 are reset depending on the cover-opened time period Topen sequentially in the order of block arrangement from the open end (the front end opposite to the rotation shaft 12) of the upper cover 11 to the rotation shaft 12, i.e., from the front side to the rear side of the printer 1 is as follows. In general, in the case of the upper cover 11 turning around the rotation shaft 12 as a supporting axis, the LED unit 40K provided at the open end of the upper cover 11 is likely to be first touched by the user (see FIG. 4). Therefore, by setting the predetermined time period (K1-1) for the LED unit 40K provided at the open end of the upper cover 11 to be the shortest and resetting the block 115K first, it is possible to avoid electrostatically caused malfunction in a preferable manner.

4. Effects of Embodiment

When the cover-opened time period Topen is shorter than the predetermined time period K1, the main ASIC 102 does not render valid the reset signal Reset or reset the blocks 115. Therefore, for instance, when the cover-opened time period Topen is too short for the user to touch the inside of the main body 10, the blocks 115 are not reset. Thereby, it is possible to reduce unnecessary stop operations for the sub ASIC 114 and improve efficiency of the image formation by the printer 1.

In addition, after lapse of the predetermined time period K1, each of the blocks 115 is set to the reset state. Therefore, it is possible to avoid malfunction of the blocks 115 electrostatically caused when the user touches an earth contact point 82 of an LED head 41 in an operation.

Further, the reset state of each of the blocks 115 is released after lapse of the predetermined time period K2 since the upper cover 11 has been closed. Therefore, it is possible to prevent the operations of setting and releasing the reset states of the block 115 from being unnecessarily repeated by the main ASIC 102.

Further, when the user opens the upper cover 11 during the printing operation by the printer 1, the sub ASIC 114 is concurrently stopped (reset). Hence, even when the user touches an earth contact point 82 of an LED head 41, for example, during an operation of settling a paper jam, it is possible to avoid electrostatically caused malfunction of the sub ASIC 114.

Moreover, by setting the predetermined time period K1 defined from the moment when the upper cover 11 is opened individually for each of the blocks 115 and resetting the blocks 115 at respective different moments, it is possible to reduce unnecessary stop operations for the blocks 115 depending on the cover-opened time period Topen during which the upper cover 11 is opened. Thereby, it is possible to shorten the initialization time period, and thus it leads to improved efficiency of the image formation by the printer 1.

Further, when the predetermined time period K1 is set individually for each of the blocks 115, by first resetting the block 115K which corresponds to the LED unit 40K located the closest to the open end of the upper cover 11, it is possible to avoid electrostatically caused malfunction in a preferable manner.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

(1) In the aforementioned embodiment, a control system is configured with the sub ASIC 114 provided to the upper cover 11 and the main ASIC 102 provided to the main body 10, and the main ASIC 102 is adapted to interrupt the operations of the sub ASIC 114 and to release the interrupted state. However, for example, a control circuit configured to process image data for forming an image, an interrupting unit configured to interrupt the image data processing of the control circuit when a time period during which the upper cover 11 is kept opened reaches a predetermined time period, and a releasing unit configured to release the interrupted state of the image data processing by the control unit may separately be provided.

(2) In the aforementioned embodiment, the main ASIC 102 interrupts the operations of the sub ASIC 114 by supplying the reset signals to the sub ASIC 114. However, for example, a function for interrupting the operations of the sub ASIC 114 and a function for releasing the termination of the operations may be achieved by a power source supply unit. Specifically, the power source supply unit may be configured to, in response to the upper cover 11 being opened/closed, interrupt/resume the operations of the sub ASIC 114 through ON/OFF control of power supply to the sub ASIC 114.

(3) The aforementioned practical example 3 of the embodiment has exemplified that the block 115K is first reset. However, the block 115C may first be reset. In other words, the main ASIC 102 may be configured to first reset a predetermined one of the plural blocks 115. In such a configuration, even when an initialization process is required after the termination of the operations of the sub ASIC 114 is released, as the operations of all the blocks are not necessarily required to be terminated, the initialization process can promptly be achieved. Hence, it is possible to improve efficiency of the image formation by the printer 1. Additionally, a block 115, which is likely to be electrostatically influenced when the upper cover 11 is opened, may be selected appropriately depending on a situation as a block to be first reset.

(4) In the aforementioned embodiment, the LED head 41 using the LEDs is employed to expose the surface of the photoconductive drum 53 with light emitted thereby. However, as substitute for the LEDs, light emitting elements such as electroluminescence (EL) devices, fluorescent substances, and laser emitting devices may be employed. Further, as substitute for the LED head 41, a unit may be employed which has multiple light shutters aligned (e.g., liquid crystal devices, PLZT devices, etc.) and selectively controls respective open/close time periods of the multiple light shutters based on the image data.

What is claimed is:

1. An image forming device, comprising:

a processor configured to process image data;

an image forming unit configured to perform image formation based on the image data processed by the processor;

a cover configured to, when being opened, allow an external access to the image forming unit therethrough;

a detector configured to detect whether the cover is opened; and an interrupting unit configured to determine whether to interrupt or maintain the processing of the image data by the processor based on a cover-opened time period during which the cover is kept opened, the interrupting unit being configured to:

control the processor to interrupt the processing of the image data when determining with the detector that the cover-opened time period is greater than or equal to a first time period; and control the processor to maintain the processing of the image data when determining with the detector that the cover-opened time period is less than the first time period.

2. The image forming device according to claim 1, wherein the interrupting unit is configured to interrupt the processing of the image data by transmitting a reset signal.

3. The image forming device according to claim 1, further comprising a releasing unit configured to, when determining with the detector that the cover is being closed for a second time period in an interrupted state where the processing of the image data is interrupted, release the interrupted state.

4. The image forming device according to claim 3, further comprising:
a main body;
a main processor provided to the main body, the main processor being configured to transmit the image data to the processor;
a photoconductive body placed in the main body; and
an exposure unit provided to the cover, the exposure unit being configured to expose a surface of the photoconductive drum,
wherein the processor is provided to the cover and configured to drive the exposure unit based on the image data.

5. The image forming device according to claim 4, wherein the main processor comprises the interrupting unit and the releasing unit.

6. The image forming device according to claim 5, wherein the exposure unit comprises a plurality of light emitting units that corresponds to different colors, respectively, each of the light emitting units being configured to be driven based on image data of a corresponding one of the colors,
wherein the processor comprises a plurality of blocks each of which is configured to transmit the image data of a corresponding one of the colors to a corresponding one of the light emitting units, and
wherein the main processor is configured to, when determining with the detector that the cover-opened time period is greater than or equal to the first time period, interrupt at least predetermined one of the blocks.

7. The image forming device according to claim 6, wherein the first time period is settable individually for each of the blocks.

8. The image forming device according to claim 7, wherein the cover has a first end at which a rotational shaft is provided and a second end opposite to the first end, the second end of the cover being configured to be opened or closed when the cover is rotated around the rotational shaft as a supporting axis, and
wherein the first time period for each of the blocks is set shorter for a block corresponding to a light emitting unit that is disposed closer to the second end of the cover.

9. The image forming device according to claim 6, wherein the cover has a first end at which a rotational shaft is provided and a second end opposite to the first end, the second end of the cover being configured to be opened or closed when the cover is turned around the rotational shaft as a supporting axis, and
wherein a light emitting unit corresponding to the at least predetermined one block is disposed closer to the second end of the cover than other light emitting units.

10. The image forming device according to claim 1, wherein the interrupting unit is configured to when determining with the detector that the cover is opened during the image formation performed by the image forming unit, interrupt the processing of the image data by the processor without waiting until the first time period elapses.

11. The image forming device according to claim 1, further comprising:
a main body;
a main processor provided to the main body, the main processor being configured to transmit the image data to the processor;
a photoconductive body placed in the main body; and
an exposure unit provided to the cover, the exposure unit being configured to expose a surface of the photoconductive drum,
wherein the processor is provided to the cover and configured to drive the exposure unit based on the image data.

12. The image forming device according to claim 11, wherein the exposure unit comprises a plurality of light emitting units that corresponds to different colors, respectively, each of the light emitting units being configured to be driven based on image data of a corresponding one of the colors,
wherein the processor comprises a plurality of blocks each of which is configured to transmit the image data of a corresponding one of the colors to a corresponding one of the light emitting units, and
wherein the first time period is settable individually for each of the blocks.

13. The image forming device according to claim 12, wherein the cover has a first end at which a rotational shaft is provided and a second end opposite to the first end, the second end of the cover being configured to be opened or closed when the cover is rotated around the rotational shaft as a supporting axis, and
wherein the first time period for each of the blocks is set shorter for a block corresponding to a light emitting unit that is disposed closer to the second end of the cover.

* * * * *